(12) United States Patent
Schukar et al.

(10) Patent No.: US 10,821,350 B1
(45) Date of Patent: Nov. 3, 2020

(54) SMART GAME BOARD

(71) Applicant: The Last Gameboard, INc., Denver, CO (US)

(72) Inventors: Shail Schukar, Denver, CO (US); Robert Wyatt, Boulder, CO (US); Timothy M. Schukar, Denver, CO (US)

(73) Assignee: THE LAST GAMEBOARD, INC., Denver, CO (US)

( * ) Notice: Subject to any disclaimer, the term of this patent is extended or adjusted under 35 U.S.C. 154(b) by 0 days.

(21) Appl. No.: 16/553,795

(22) Filed: Aug. 28, 2019

Related U.S. Application Data

(60) Provisional application No. 62/723,622, filed on Aug. 28, 2018.

(51) Int. Cl.
| | | |
|---|---|---|
| *A63F 3/00* | (2006.01) | |
| *G06F 3/041* | (2006.01) | |
| *G06F 3/0346* | (2013.01) | |
| *G01S 13/74* | (2006.01) | |
| *A63F 13/23* | (2014.01) | |

(52) U.S. Cl.
CPC .......... *A63F 3/00643* (2013.01); *A63F 13/23* (2014.09); *G01S 13/74* (2013.01); *G06F 3/0346* (2013.01); *G06F 3/041* (2013.01)

(58) Field of Classification Search
CPC ...... A63F 3/00643; A63F 13/23; G06F 3/041; G06F 3/0346; G01S 13/74
See application file for complete search history.

(56) References Cited

U.S. PATENT DOCUMENTS

| | | | |
|---|---|---|---|
| 7,928,965 B2 | 4/2011 | Rosenblatt et al. | |
| 8,147,316 B2 | 4/2012 | Arezina et al. | |
| 8,718,553 B2 | 5/2014 | Parekh et al. | |
| 9,001,082 B1 | 4/2015 | Rosenberg et al. | |
| 9,218,561 B2 | 12/2015 | Yilmaz | |
| 9,256,773 B2 | 2/2016 | Finn | |
| 9,442,555 B2 | 9/2016 | Bernard et al. | |
| 9,459,746 B2 | 10/2016 | Rosenberg et al. | |
| 9,489,097 B2 | 11/2016 | Johansson et al. | |
| 9,703,433 B2 | 7/2017 | Chandran et al. | |
| 9,722,318 B2 | 8/2017 | Adriazola et al. | |
| 9,859,616 B2 | 1/2018 | Ikeda et al. | |
| 9,922,618 B2 | 3/2018 | Prendergast et al. | |
| 9,946,906 B2 | 4/2018 | Ricci | |
| 10,073,565 B2 | 9/2018 | Rosenberg et al. | |
| 10,268,321 B2 | 4/2019 | Poupyrev | |
| 10,310,620 B2 | 6/2019 | Lien et al. | |
| 10,313,141 B1 | 6/2019 | Elberbaum | |
| 2006/0180647 A1* | 8/2006 | Hansen | B60S 3/00 235/375 |
| 2006/0217232 A1* | 9/2006 | Kondrat | A63B 69/0028 482/3 |
| 2007/0211689 A1* | 9/2007 | Campero | G06K 7/10316 370/351 |

(Continued)

*Primary Examiner* — Jeffrey S Vanderveen
(74) *Attorney, Agent, or Firm* — Hall Estill Attorneys at Law; Tyler J. Mantooth

(57) ABSTRACT

A smart game board can consist of a radio frequency identification localizing array positioned between a touch sensing layer and a display panel. A dielectric layer can contact the touch sensing layer and provide a playing surface where at least one at least one game piece can contact the playing surface to conduct a game.

19 Claims, 4 Drawing Sheets

(56) References Cited

U.S. PATENT DOCUMENTS

| | | |
|---|---|---|
| 2008/0266192 A1* | 10/2008 | Tuttle .................... H01Q 21/24 |
| | | 343/756 |
| 2011/0267311 A1 | 11/2011 | Yeh |
| 2012/0092284 A1* | 4/2012 | Rofougaran .......... H04M 1/725 |
| | | 345/173 |
| 2013/0059532 A1 | 3/2013 | Mahaufar et al. |
| 2014/0078094 A1 | 3/2014 | Yang |
| 2016/0030835 A1 | 2/2016 | Argiro |
| 2016/0354679 A1* | 12/2016 | Shi ...................... A63F 3/00643 |
| 2018/0101232 A1* | 4/2018 | Levesque ................ G06F 3/016 |
| 2018/0251370 A1* | 9/2018 | Maurer .......... H01L 31/022466 |
| 2018/0275757 A1* | 9/2018 | Cruz-Hernandez ......................... |
| | | G06F 3/0412 |
| 2019/0332196 A1* | 10/2019 | Weins ................ G06F 3/03545 |

\* cited by examiner

SMART GAME BOARD

RELATED APPLICATION

The present application makes a claim of domestic priority to U.S. Provisional Patent Application No. 62/723,622 filed Aug. 28, 2018, the contents of which are hereby incorporated by reference.

SUMMARY

In accordance with various embodiments, a smart game board has a radio frequency identification localizing array positioned between a touch sensing layer and a display panel. A dielectric layer can contact the touch sensing layer and provide a playing surface where at least one at least one game piece can contact the playing surface.

Other embodiments of a smart game board have a display panel and a radio frequency identification localizing array positioned atop and in contact with the display panel. A touch sensing layer is positioned atop the radio frequency identification localizing array and a playing surface is positioned atop the touch sensing layer. At least one game piece contacts the playing surface.

DETAILED DESCRIPTION

Figure 1:
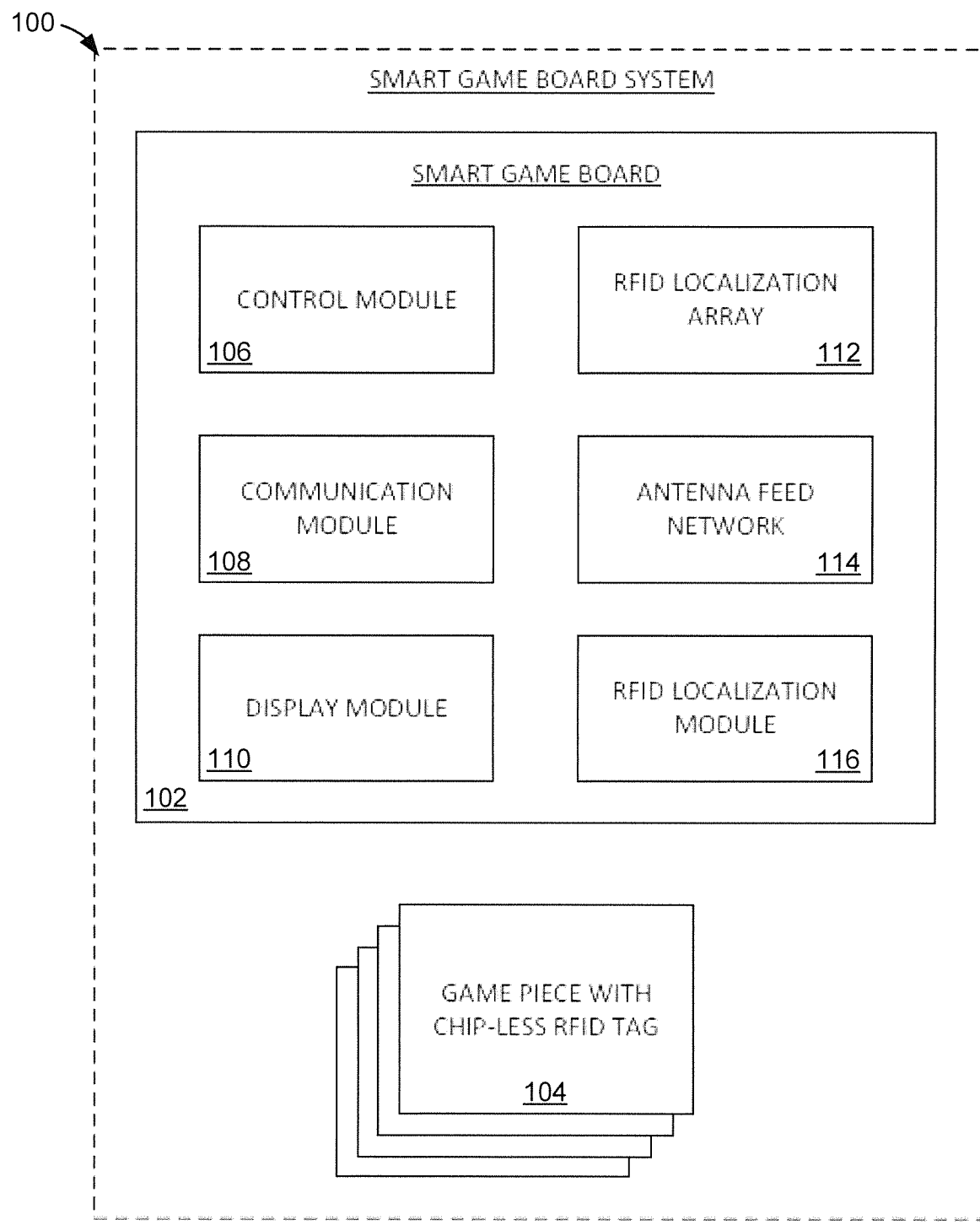
FIG. 1 depicts a block representation of an example smart game board system in which various embodiments may be practiced.

Embodiments of the present disclosure include a smart game board system that can implement game pieces identifiable by radio frequency identification technology and correlation of persistent touchscreen (or digitizer) data. The smart game board system can typically include a smart game board and a plurality of game pieces. In one embodiment, a radio frequency identification (RFID) localization array can be integrated with a touchscreen (or digitizer) of the smart game board. A plurality of RFID tags can be configured to be attached (or secured) to the game piece chosen by a user. As can be appreciated, the RFID localization array can be configured to determine an approximate location of a particular RFID tag. This approximate data is correlated via software with active or non-active/persistent, raw touchscreen data to 1 mm by 1 mm accuracy, thus providing a location and identification on the smart game board of a game piece of a user. Typically, each of the RFID tags can be encoded with a unique identifier to allow the smart game board to distinguish between different game pieces, and read/write to the RFID microchip(s).

The smart game board can consist of a display module, a control module, software components, and a power source. The display module can consist of a display and a touchscreen. The control module can typically have, but is not limited to, a processor, random access memory, and non-volatile storage. The processor may be a single microprocessor, multi-core processor, or a group of processors. The random access memory can store executable code as well as data that can be immediately accessible to the processor. The non-volatile storage can store executable code and data in a persistent state. The control module can also include a communication module (or network interface). The network interface can provide, but is not limited to, hardwired and wireless interfaces through which the smart game board can communicate with other devices. The control module can further include software, applications, programs, etc. configured to use the game piece location information for interactive use of the smart game board by one or more users.

Various embodiments configure a smart game board as devices, systems, methods, and/or computer program products. Accordingly, the embodiments can be realized in hardware and/or in software, such as firmware, resident software, and micro-code. Furthermore, a smart game board can take the form of a computer program product on a computer-usable or computer-readable storage medium having computer-usable or computer-readable program code embodied in the medium for use by or in connection with an instruction execution system. In one embodiment, embodiments can be realized as non-transitory computer-readable media. In the context of this document, a computer-usable or computer-readable medium can correspond to, but is not limited to, any medium that can contain, store, communicate, propagate, or transport the program for use by or in connection with the instruction execution system, apparatus, or device. The computer-usable or computer-readable medium can be, but is not limited to, an electronic, magnetic, optical, electromagnetic, infrared, or semiconductor system, apparatus, device, or propagation medium.

It is noted that the terms and phrases as indicated in quotation marks (" ") throughout this disclosure are intended to have the meaning ascribed to them herein are to be applied throughout this document, including in the claims, unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive; rather the term is inclusive, meaning either or both. References in the specification to "one embodiment", "an embodiment", "another embodiment, "a preferred embodiment", "an alternative embodiment", "one variation", "a variation" and similar phrases mean that a particular feature, structure, or characteristic described in connection with the embodiment or variation, is included in at least an embodiment or variation of the invention. The phrase "in one embodiment", "in one variation" or similar phrases, as used in various places in the specification, are not necessarily meant to refer to the same embodiment or the same variation. The term "couple" or "coupled" as used in this specification and appended claims refers to an indirect or direct physical connection between the identified elements, components, or objects. Often the manner of the coupling will be related specifically to the manner in which the two coupled elements interact.

The term "directly coupled" or "coupled directly," as used in this specification and appended claims, refers to a physical connection between identified elements, components, or objects, in which no other element, component, or object resides between those identified as being directly coupled.

The term "approximately," as used in this specification and appended claims, refers to plus or minus 10% of the value given.

The term "about," as used in this specification and appended claims, refers to plus or minus 20% of the value given.

The terms "generally" and "substantially," as used in this specification and appended claims, mean mostly, or for the most part. Directional and/or relationary terms such as, but not limited to, left, right, nadir, apex, top, bottom, vertical, horizontal, back, front and lateral are relative to each other and are dependent on the specific orientation of an applicable element or article, and are used accordingly to aid in the description of the various embodiments and are not necessarily intended to be construed as limiting.

The term "software," as used in this specification and the appended claims, refers to programs, procedures, rules, instructions, and any associated documentation pertaining to the operation of a system.

The term "firmware," as used in this specification and the appended claims, refers to computer programs, procedures, rules, instructions, and any associated documentation contained permanently in a hardware device and can also be flashware.

The term "hardware," as used in this specification and the appended claims, refers to the physical, electrical, and mechanical parts of a system.

The term is "computer-usable medium" or "computer-readable medium," as used in this specification and the appended claims, refers to any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

The term "signal," as used in this specification and the appended claims, refers to a signal that has one or more of its characteristics set or changed in such a manner as to encode information in the signal. It is to be appreciated that wireless means of sending signals can be implemented including, but not limited to, Bluetooth, Wi-Fi, acoustic, RF, infrared and other wireless means.

Turning to the drawings, FIG. 1 depicts a block representation of an example smart game board system 100 in which various embodiments can be practiced. Although not required or limiting, the smart game board system 100 can comprise one or more smart game boards 102 and one or more game pieces 104. Operation of a smart game board 102 be directed by a control module 106, a communications module 108, a display module 110, such as a display and a touchscreen, and a power source (not shown). It is noted that a display may employ one or more optical technologies, such as liquid crystal display (LCD), light-emitting diodes (LED), organic light-emitting diodes (OLED), and active matrix organic light-emitting diodes (AMOLED).

The smart game board 102 can employ a radio frequency identification (RFID) localization array 112, an antenna feed network 114, and a RFID localization module 116. In a non-limiting embodiment, the RFID localization array 112 can be integrated into an architecture of the display module 110. For instance, the RFID localization array 112 may be printed onto the touchscreen. In another instance, the RFID localization array 112 can be a layer coupled to the touchscreen. In some embodiments, some or all of the components of the RFID localization module 116 can be part of the control module architecture.

Each game piece 104 can have an RFID tag. In some instance, the RFID tags can be integrated into or proximate a bottom of the game piece. In other instances, a user may select an object to act as a game piece 104 and the object can be retrofitted with an RFID tag. For instance, the RFID tag can be manufactured with an adhesive on one side to adhere to the object, thus converting the object into a passive game piece for use with the smart game board. As can be appreciated, other means of attaching the RFID tags to a game piece are contemplated and not outside of scope of the present smart game board system 100.

Embodiments of a smart game board system 100 can allow for end users to provide their own game pieces 104 that can then be detected and used by the software of a smart game board 102. In one example, mass-manufactured game piece "feet" that can integrate the RFID tags can be provided to end users. Thus, end users can attach a unique "foot" to their game piece 104 to play. As can be appreciated, there must be enough unique "feet" for the total number of game pieces 104 expected to be in play at any given time. In one embodiment, chip-less RFID tags can be completely passive, requiring no maintenance or upkeep by the end user to operate. In one embodiment, the 5.725 to 5.875 GHz ISM band may be chosen. Of note, the 5.725 to 5.875 GHz ISM band can allow for antenna sizes that should naturally integrate well into overall game-square size.

By utilizing chip-less RFID tags, traditional RFID chips associated with passive RFID tags. In one instance, a unique conductive pattern can be generated that can encode a certain amount of information through encoding bits in backscattered radiation when the tag is excited by a reader antenna. These can be further miniaturized by using high-Q tags, eschewing the need for more complex tags. A Q parameter of an RFID system corresponds with the probability of an accurate RFID communication. It is contemplated that a variety of different possible chip-less RFID tags could potentially be optimized for different kinds of game pieces 104. Advances in printing can open the door to much higher Q structures than available on printed circuit board processes and reduce the wide frequency range required for spectral chip-less techniques.

Some embodiments, the RFID tags can be implemented with other objects. For instance, an RFID tag may be embedded or attached to a glove finger to allow for pinching and rotating in 3D space without touching the touchscreen and interacting with the smart game board. As can be appreciated, this could allow for computer input interactions in a 3D plane. For example, this could involve some sort of wearable that would allow for multi-gesture interaction with a computer driven display, such as traditional thin-film transistor (TFT), LCD, LED, OLED. and holographic displays. In another instance, the RFID tag can be 3D printed inside an actual physical game piece 104.

Embodiments are contemplated wherein the smart game board system 100 allows for a physical object to interact on a 3D volume. For example, a Harry Potter "wand" that requires certain movements to cast a spell against an AR villain. In another example, an RFID printed "scalpel" that would allow for augmented reality (AR) surgery training. In such an embodiment, tracking in the Z-direction can be based on signal attenuation to some max radius "Z" from the center of the board. For instance, when the locating antenna signal is pulsed, the source amplitude as well as the nominal attenuation from the board itself are known. Then, based on signal processing, the signal strength can be determined at each of the receiving antennas. As can be appreciated, the process can be similar to how to locate in 2D (technically locating in 3D, but at a fixed Z-level from the antenna layer), except that the algorithm will need to be calibrated to place objects at a higher elevation when receiving lower signal strength.

The antenna feed network can be implemented to reduce the many antennas down to one port that can be used with an individual transceiver for overall cost reduction. In one example, this can be done with a simple corporate feed structure with radio frequency single-pole double throw (SPDT) switches at each junction.

To manage information from the antenna array, the antennas can be connected using a switched-array configuration. A switching matrix can connect all antennas to a common transceiver. The antennas can be sequentially switched, with information from each antenna being collected. Once all antennas have been switched to, post-processing of the collected data along with the persistent touchscreen touch data can yield precise game piece locations.

The RFID localizing module 116 can comprise hardware circuitry and/or software adapted to be able to take signals from the antenna array and responding RFID tags and determine a position of the RFID tags. The RFID localizing module 116 can then format the information for consumption by the rest of a smart game board 102 through a Serial Peripheral Interface (SPI). In one example, the RFID localizing module 116 can employ a single transceiver and localizing software. For instance, there can be a single transceiver that interfaces with every antenna in the array through the previously described antenna feed network 114.

The RFID localizing module 116 can include a field programmable gate-array (FPGA) that runs both the localization algorithms and controls the radio frequency circuitry. The radio frequency front end can be a traditional superheterodyne transceiver designed for the traditional 13.56 Hz band or chip-less 5.8 GHz ISM band. Other radio frequency components on the front end can include filters for optimal out-of-band signal rejection, as well as radio frequency amplifiers for maximizing signal-to-noise ratio. Of note, after a down conversion to intermediate frequency (IF), additional amplifier and filter blocks can be used to improve overall signal quality. Analog-to-digital converters (ADC) and digital-to-analog converters (DAC) can be used for taking data between the FPGA and IF sections of the RFID localizing module 116.

Figure 2:
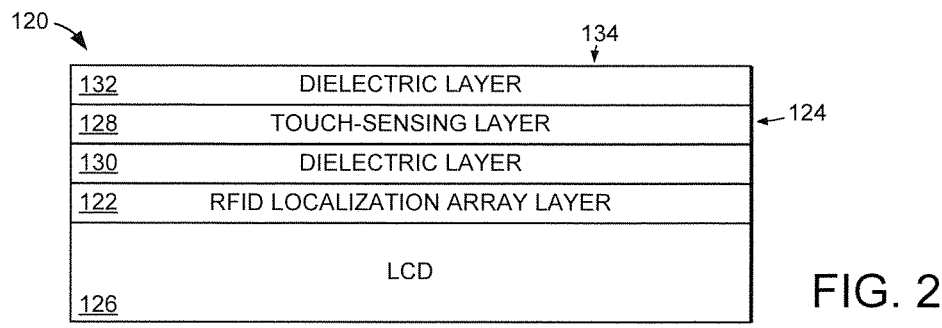
FIG. 2 depicts a cross-sectional block representation of portions of an example smart game board arranged in accordance with various embodiments.

FIG. 2 depicts a cross-sectional line representation of portions of an example display module 120 capable of being used in the smart game board system 100 of FIG. 1. As shown, the RFID localization array 112 is configured as a single array layer 122 can be located beneath the touchscreen 124 and on top of the display 126, which shown in a non-limiting embodiment as an LCD display. Of note, by putting the RFID localization array layer 122 proximate a top layer of the display module 120, the RFID tags can be located relatively close to the localization array 112, such as less than 5 mm.

In one embodiment, the RFID localization array layer 122 can be integrated either underneath or on top of a touch-sensing layer 128 of the touchscreen 124. In one instance, a layer of transparent conducting film, such as indium tin oxide (ITO), can be used to create the antenna geometry as part of the RFID localization array layer 122. As can be appreciated, this can allow for the smart game board to still be touch interactive while also enabling RFID localization functionality. Embodiments of the ITO based antenna array can be highly transparent optically when manufactured in a grid-like structure. In other embodiments, sheet like ITO antennas can have much larger efficiency than the wire grid ones at the expense of decreased optical transparency through the antenna. The touchscreen-integrated RFID localization array can be transparent to a user and can seamlessly integrate into an architecture of a display module. As can be appreciated, this structure can be advantageous in that the RFID antennas are very close to the game piece RFID tags, and hence the signal-to-noise ratio (SNR) will be maximized, aiding better identification of a game piece.

While not required or limiting, the touch-sensing layer 128 can be separated from the RFID localization array layer 122 by one or more dielectric layers 130 that provide efficient and accurate manufacturability and operation. A top-most dielectric layer 132 can contact the touch-sensing layer 128, as shown, to provide a playing surface 134 configured to receive one or more game pieces and facilitate both RFID communication with the RFID localization array layer 122 and conventional touchscreen 124 operation via manual manipulation of the playing surface 134. The RFID localization array layer 122 position and construction allows unique identification and positioning of multiple different and/or separate game pieces while the touch-sensing layer 128 concurrently provides persistent touch data. The combination of the radio frequency and touch data allows for downstream processing to accurately approximate the location of a game piece relative to the playing surface 134, even if the game piece is not physically touching the playing surface 134 or being touched by a human user.

Figure 3:
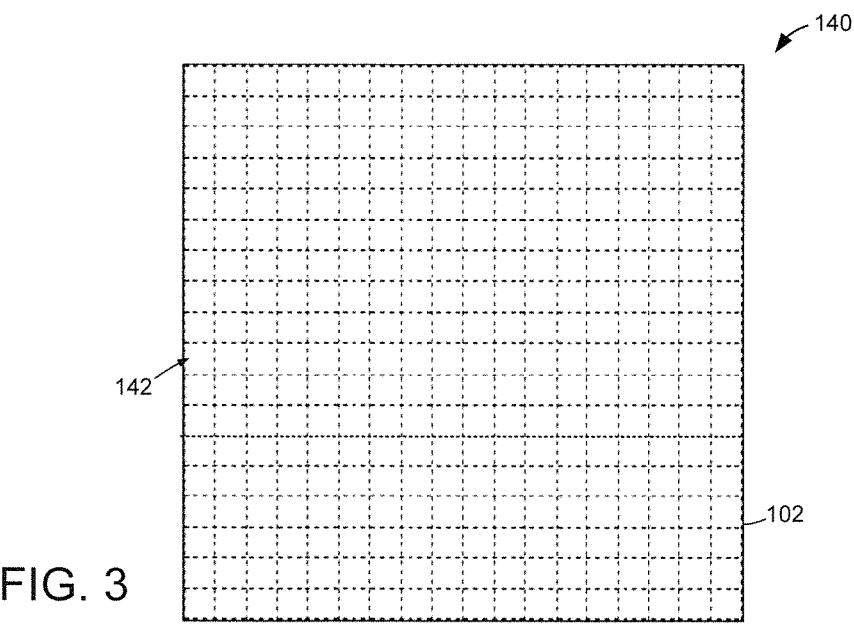
FIG. 3 depicts a top view representation of portions of an example smart game board configured in accordance with some embodiments.

FIG. 3 depicts a top view line representation of an example RFID localization array layer 140 portion of a smart game board 102 configured and operated in accordance with some embodiments. The RFID localization array layer 140 can consist of an RFID antenna grid 142 arranged as a plurality of antennas approximately sized 1" by 1". The RFID antenna grid 142 of the RFID localization array layer 140 can detect the RFID tags from which an approximate location on the game board for each game piece can be determined by an RFID localization module. The design of the RFID grid 142 shown in FIG. 3 is meant for illustrative purposes only and is not meant to be limiting. For instance, a smaller or larger antenna grid size may be implemented depending on a screen size of the game board 102. Of significant note, although the antenna grid is shown, it is to be appreciated that the RFID antenna grid 142 would be transparent and not interfere with an image produced by the display.

With the efficient combination of a touchscreen persistent touch data 124 and an RFID localization array layer 122, numerous physical game pieces can be uniquely and independently tracked within the gameplay surface where any one space is no smaller than 1 mm by 1 mm. The use of RFID for game piece positioning has shown great promise in close-range localization. The concept of some embodiments revolves around integrating custom, passive RFID tags into game pieces that reside on a playing surface of the game board. These game pieces would then be queried by RFID readers using a single antenna or antenna arrays employing a plurality of separate antennas. Underlying software and hardware would then act upon the resulting RFID tag signals and persistent touch data and determine the 2-D position of each tag/game piece on the game board. An example smart game board system can consist of at least an RFID antenna array, an RFID tag, and an RFID localizing module.

It is noted that an antenna array is used to communicate with the RFID tags as well as aid in collecting information for localizing the position of each tag/piece on a game board. The main problem to be solved with an antenna array is to determine how and where to put an antenna array to enable accurate localization of game pieces while not disturbing the user experience. The current non-limiting implementations of an antenna array involve a digitizer-integrated RFID localizing array or an above-screen RFID localizing array.

For a digitizer-integrated RFID localizing array, an RFID localization array layer can be positioned either underneath or within the existing touch-sensing layer of the touch display. A layer of transparent conducting film, such as Indium Tin Oxide (ITO) is used to create the antenna geometry, which allows for a game board to still be touch interactive while also enabling RFID localization functionalities. ITO based antennas have demonstrated reasonable radio frequency performance while providing substantially optically transparent structure. Sheet like ITO antennas can have much larger efficiencies than if a conductive wire grid was employed, but such wire grid configurations suffer from decreased optical transparency through the antenna. In the example display module 120 of FIG. 2 where the RFID technology is transparent to the user, the RFID localization array layer 122 seamlessly integrates into the regular liquid crystal display.

It is noted that assorted embodiments of a smart game board configure the RFID localization array layer to ensure touchscreen technology is not adversely affected by the RFID localization array layer, and similarly, that the RFID localization array layer is not adversely affected by the touchscreen layer. It is contemplated that a display module can ensure sufficient isolation between the various radio frequency traces and antennas of the RFID localization array layer to allow for accurate and efficient game piece localization despite the presence of a touch-sensing layer. The transmission line characteristics of the RFID localization array layer can be configured to ensure sufficient SNR for received signals while the RFID grid is unobservable to an end-user.

Figure 4:
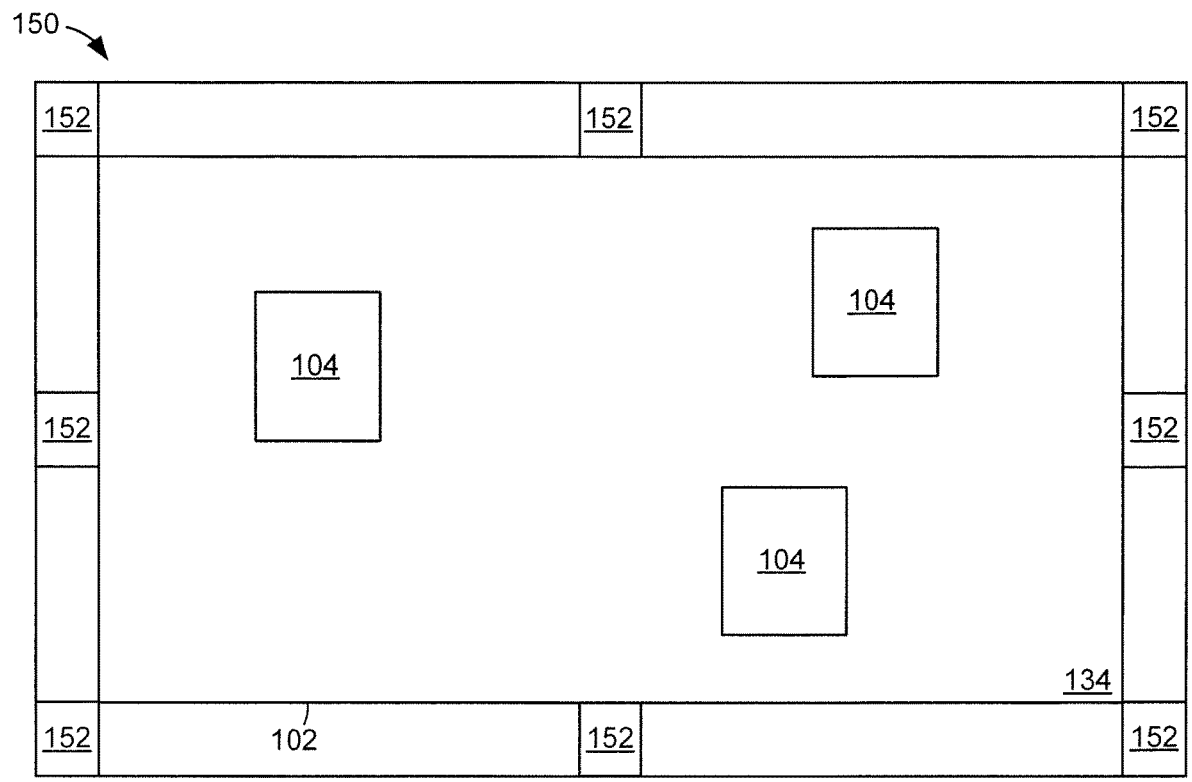
FIG. 4 depicts a top view representation of portions of an example smart game board constructed and operated in accordance with assorted embodiments.

FIG. 4 depicts a top view line representation of portions of an example smart game board system 150 constructed and operated in accordance with assorted embodiments. It is noted that the configuration of the smart board game system 150 can incorporate the cross-sectional construction of FIG. 2 or have a different lamination arrangement. In the board system 150 of FIG. 4, physically separate RFID antennas 152 are each flush with the edge of the game board 102. As the antennas 152 are nearly flush with the playing surface 134 there is little impediment to the users playing and interacting with a game. However, the overall dimensions of system 150 increase to allow for the width of the integrated antennas 152.

By using several antennas 152, localization of each of the RFID tags on the game board 102 is possible. The game piece tags encode information about what each piece is, while the received signal amplitude and phase information will enable direction of arrival (DOA) of each tag. These sorts of direct DOA approaches can be combined with circuitry and intelligence for improved accuracy. The antennas 152 are integrated on the edge of the game board 102. For the antennas 152 to be planar, they could be either patches in a higher operating mode, or in the fundamental mode if raised above and pointed inward.

In the example game board 102 of FIG. 4, game pieces 104 located on top of the board in contact with the playing surface 134. Antennas 152 located on the edge of the board 102 form an array for DOA. To manage the information collected by the antennas 152, a switched-array matrix can be utilized to connect all antennas 152 to a common transceiver. The antennas 152 may be sequentially switched while game piece 104 information is concurrently collected from the respective antennas 152. Once all antennas 152 have been switched and polled, post-processing of the collected data by the localization module yields game piece 104 locations in two, or three, dimensions.

The game board 102 configuration of FIG. 4 can be optimized to determine one or more operating frequencies that ensure sufficient resolution for game piece 104 localization. The structural configuration of the antennas 152 and RFID localization array layer 122 provide phase matching between different antennas 152 to a single transceiver and quantifies the impact of a game piece 104 not being placed in the center of a grid square of the RFID grid.

Figure 5:
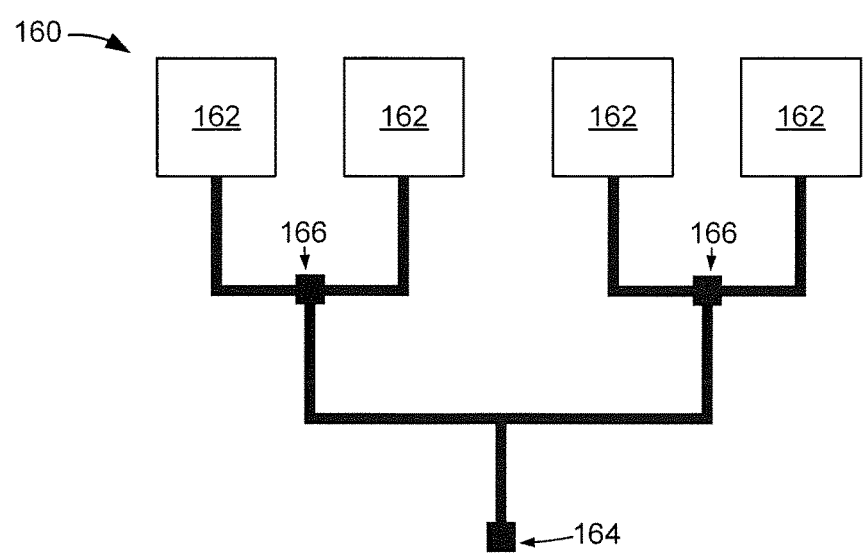
FIG. 5 depicts a block representation of portions of an example network that can be employed in a smart game board in various embodiments.

FIG. 5 depicts a block representation of portions of an example antenna feed network 160 that can be employed in a game board in accordance with some embodiments. It is noted that the antenna feed network 160 is needed to reduce the many antennas 162 down to one port 164 that can be used with an individual transceiver for overall cost reduction. Various embodiments accomplish this with a simple corporate feed structure with radio frequency single-pole double throw (SPDT) switches 166 at each junction.

It is contemplated that depending on the structural and operational characteristics of the respective antenna elements and overall antenna array, the physical size of the network 160 can be minimized while preventing coupling from disrupting localization performance, decreasing feed network losses, and reducing phase and amplitude imbalance between all antennas 162 in the network 160.

Figure 6:
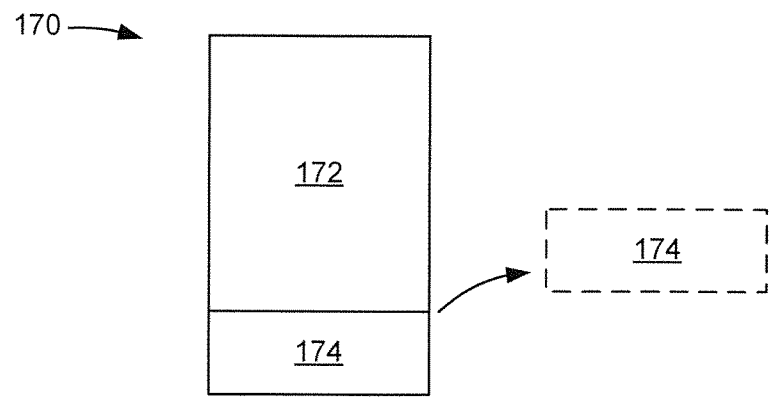
FIG. 6 depicts a block representation of an example game piece that can be utilized in a smart game board in assorted embodiments.

FIG. 6 depicts a block representation of an example game piece 170 that can be employed in a smart game board system in accordance with some embodiments. While a game piece 170 can be configured with a permanently integrated RFID feature into a piece body 172, embodiments allow for end-users to provide their own game pieces 170 that can then be detected and used by the underlying game software. To accomplish this, mass-manufactured game piece "feet" tags 174 can be integrated onto a game piece body 172 by a manufacturer and/or an end-user. Thus, end-users simply attach pieces 172 expected to be in play at any given time.

It is contemplated that the RFID tags of the feet tags 174 will be completely passive, requiring no maintenance or upkeep by the end-user to operate. Some embodiments create custom tags 174 at a high-enough frequency to allow for easy integration into the overall board. The 5.725 to 5.875 GHz ISM band may be used, for being part of the unlicensed spectrum, as well as having antenna sizes that should naturally integrate well into overall game-square size.

Chip-less RFID technology eschews the traditional chip associated with passive RFID tags 174. Instead, a unique conductive pattern is generated that can encode a certain amount of information through encoding bits in backscattered radiation when the chip is excited by a reader antenna. These can be further miniaturized by using high-Q tags 174, eschewing the need for more complex tags 174. It is contemplated that frequency division is used for information encoding. As a result, nearly 23-bit tags 174 can be employed, which allow for over 8-million unique game-piece identifiers and support chip-less RFID providing more than sufficient information for unique game-piece identification. Depending on the antenna array configurations, tags 174 can be configured to allow maximum communication with arrays anywhere on the board. It is noted that the variety of different possible chip-less RFID tags means tags 174 could potentially be optimized for different kinds of game pieces. Advances in printing allows for much higher Q tag 174 structures than available on printed circuit board processes and reduce the wide frequency range required for spectral chip-less techniques.

Figure 7:
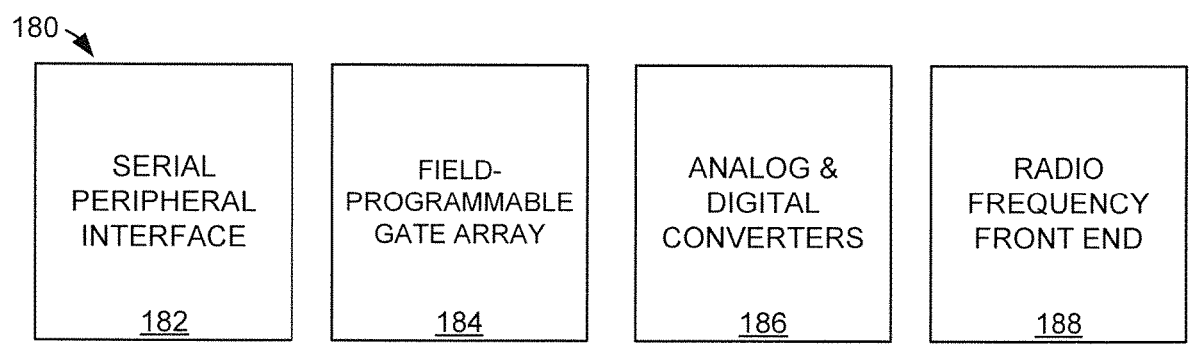
FIG. 7 depicts a block representation of an example electrical subsystem that may be incorporated in a smart game board in some embodiments.

FIG. 7 depicts a block representation of an example RFID localization module 180 that can be employed in a smart game board system in accordance with some embodiments. The RFID localization module consists of hardware and software adapted to be able to take signals from the antenna array, responding RFID tags and persistent touchscreen touch data and determine the position of the RFID tags. The module 180 must then format this information for consumption through a Serial Peripheral Interface (SPI) 182. Specifically, this module 180 consists of a single transceiver and localizing software. There will be a single transceiver that interfaces with every antenna in the array through the previously described antenna feed network. This is done to reduce cost and design complexity that exists when linking multiple transceivers together.

At the heart of the module 180 is the field programmable gate-array (FPGA) 184 that runs both the localization algorithms and controls the radio frequency circuitry. The radio frequency front end 186 will be a traditional superheterodyne transceiver design for the 13.56 Hz and/or 5.8 GHz ISM band, which is chosen for its simplicity and relatively low design risk. Other radio frequency components on the front end 186 can comprise filters for optimal out-of-band signal rejection, as well as radio frequency amplifiers for maximizing signal-to-noise ratio. After the down conversion to intermediate frequencies, additional amplifier and filter blocks can be used to improve overall signal quality. At this point, an ADC and DAC 188 are used for taking data between the FPGA and intermediate frequency sections of the localization module 180.

It is contemplated that smart game board testing will consist of placing several tagged-game pieces at different locations on the playing surface. The RFID localization array will perform measurements and attempt to locate each tag to an approximate location on the playing surface. The touchscreen (or "digitizer") touch data is then analyzed to identify persistent objects on the playing surface. The RFID supplied approximate tag locations are compared with the raw, persistent touchscreen touch data and the exact location of the gamepiece(s) are determined via software. The accuracy of the device for different tag and touch shape configurations will be analyzed, with particular emphasis on cases where the tags are located in adjacent RFID antennas, as well as when tags are near the edge of any particular RFID antenna. Cases that are particularly ambiguous, such as tags located in the very center of the board, will be investigated, to ensure there are not game states that cannot be unambiguously determined. Information gleaned from this testing phase will allow for additional array and touch data processing improvements for the localization process.

The various embodiments and variations thereof, illustrated in the accompanying Figures and/or described above, are merely exemplary and are not meant to limit the scope of the present disclosure. It is to be appreciated that numerous other variations of the technology have been contemplated, as would be obvious to one of ordinary skill in the art, given the benefit of this disclosure. All variations of the technology that read upon appended claims are intended and contemplated to be within the scope of the present disclosure.

What is claimed is:

1. An apparatus comprising a radio frequency identification (RFID) localizing array positioned between a touch sensing layer and a display panel, a dielectric layer contacting the touch sensing layer and providing a playing surface, the RFID localizing array configured to identify a three-dimensional position of a first game piece separated from the playing surface.

2. The apparatus of claim 1, wherein the RFID localizing array comprises a digitizer.

3. The apparatus of claim 1, wherein the RFID localizing array comprises multiple separate antennas.

4. The apparatus of claim 3, wherein each of the multiple separate antennas are connected to a single port via a plurality of junctions.

5. The apparatus of claim 3, wherein each of the multiple separate antennas are positioned flush around the playing surface.

6. The apparatus of claim 4, wherein each of the plurality of junctions comprise a radio frequency single-pole double-throw switches.

7. The apparatus of claim 1, wherein the RFID localizing array comprises Indium Tin Oxide.

8. The apparatus of claim 1, wherein the display panel comprises a liquid crystal display.

9. The apparatus of claim 1, wherein the RFID localizing array is separated from the touch sensing layer by a dielectric layer.

10. The apparatus of claim 1, wherein the RFID localizing array is transparent.

11. The apparatus of claim 1, wherein the RFID localizing array communicates with a second game piece contacting the playing surface.

12. The apparatus of claim 11, wherein the touch-sensing layer concurrently communicates with the second game piece, data from both the RFID localizing array and the touch-sensing layer corresponding to a two-dimensional position of the second game piece and a unique identification of the game piece.

13. The apparatus of claim 1, wherein the RFID localizing array is connected to a single transceiver.

14. The apparatus of claim 1, wherein a plurality of antennas of the RFID localizing array is planar.

15. The apparatus of claim 1, wherein the RFID localizing array is printed onto the touch sensing layer.

16. The apparatus of claim 1, wherein the RFID localizing array has a grid configuration comprising a plurality of antennas approximately 1" by 1".

17. The apparatus of claim 1, wherein the RFID localizing array communicates with a RFID tag of the second game piece contacting the playing surface.

18. The apparatus of claim 17, wherein the touch-sensing layer correlates an RFID tag to position the second game piece on the playing surface.

19. An apparatus comprising:
a display panel;

a radio frequency identification (RFID) localizing array positioned atop and in contact with the display panel;
a touch sensing layer positioned atop the RFID localizing array;
a playing surface positioned atop the touch sensing layer; and
a game piece separated from the playing surface, the RFID localizing array configured to identify a three-dimensional position of the game piece.

* * * * *